US011593273B2

(12) United States Patent
Patel et al.

(10) Patent No.: US 11,593,273 B2
(45) Date of Patent: Feb. 28, 2023

(54) MANAGEMENT OF CACHE USE REQUESTS SENT TO REMOTE CACHE DEVICES

(71) Applicant: Intel Corporation, Santa Clara, CA (US)

(72) Inventors: Nishit Patel, San Jose, CA (US); Sreedhar Ravipalli, Cupertino, CA (US); Teng Wang, San Jose, CA (US); Stephen S. Chang, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 16/262,701

(22) Filed: Jan. 30, 2019

(65) Prior Publication Data

US 2019/0171578 A1 Jun. 6, 2019

(51) Int. Cl.
| G06F 12/10 | (2016.01) |
| G06F 12/1009 | (2016.01) |
| G06F 12/0831 | (2016.01) |
| G06F 12/109 | (2016.01) |
| G06F 12/0893 | (2016.01) |
| G06F 12/0871 | (2016.01) |
| G06F 12/0895 | (2016.01) |

(52) U.S. Cl.
CPC ...... *G06F 12/1009* (2013.01); *G06F 12/0831* (2013.01); *G06F 12/0871* (2013.01); *G06F 12/0893* (2013.01); *G06F 12/0895* (2013.01); *G06F 12/109* (2013.01)

(58) Field of Classification Search
CPC .............. G06F 12/0893; G06F 12/109; G06F 12/1009; G06F 12/0895; G06F 12/0871; G06F 12/0831
See application file for complete search history.

(56) References Cited

U.S. PATENT DOCUMENTS

| 7,373,462 B2* | 5/2008 | Blumrich | G06F 12/0822 |
| | | | 711/146 |
| 2004/0117561 A1* | 6/2004 | Quach | G06F 12/0831 |
| | | | 711/146 |
| 2012/0311272 A1* | 12/2012 | Blumrich | G06F 12/0831 |
| | | | 711/146 |

FOREIGN PATENT DOCUMENTS

WO WO-2006104747 A2 * 10/2006 ......... G06F 12/0822

OTHER PUBLICATIONS

Detecting Uncached Areas of Memory to Augmenting a Cache Directory that Filters the Distribution of Snoop Commands, The IP.com Journal, Mar. 19, 2007.*
Controlling which Devices are Snooped for Each Transaction on a Snooping Multi-Processor Bus, The IP.com Journal, Mar. 19, 2007.*
E. P. Markatos and M. G. H. Katevenis, "Telegraphos: high-performance networking for parallel processing on workstation clusters," Proceedings. Second International Symposium on High-Performance Computer Architecture, 1996, pp. 144-153.*

(Continued)

*Primary Examiner* — Pierre Michel Bataille
(74) *Attorney, Agent, or Firm* — Compass IP Law PC

(57) ABSTRACT

In connection with an access of content from a cache, a snoop request can be sent to one or more remote cache devices to determine if any other cache has a copy of the content. A link between the cache and the remote cache devices can include a snoop bypass device. The snoop bypass device can monitor content cached by the one or more remote devices on a cache line or coarser granularity. The snoop bypass device can respond to the snoop request with a negative indication based on a coarser granularity tracking of content of the one or more remote cache devices.

20 Claims, 8 Drawing Sheets

(56) References Cited

OTHER PUBLICATIONS

E. Atoofian, "Adaptive Snoop Granularity and Transactional Snoop Filtering in Hardware Transactional Memory," in Canadian Journal of Electrical and Computer Engineering, vol. 37, No. 2, pp. 76-85, Spring 2014.*
ARM® CoreLink™ CCI-500 Cache Coherent Interconnect, Revision: r0p1, Technical Reference Manual, Copyright© 2014, 2015 ARM, 93 pages.
Bus snooping, Wikipedia, "https://en.wikipedia.org/w/index.php?title=Bus_snooping&oldid=866123404", Oct. 28, 2018, 3 pages.
MESI protocol, Wikipedia, "https://en.wikipedia.org/w/index.php?title=MESI_protocol&oldid=868347766", Nov. 2018, 7 pages.
Mulnix, David, Intel Xeon Processor Scalable Family Technical Overview, (https://software.intel.com/en-us/user/334904), published on Jul. 10, 2017, updated Sep. 14, 29 pages.
Numascale, Snooping Based Cache Coherence, https://www.numascale.com/snooping-based-cache-coherence/, 2 pages.

\* cited by examiner

MANAGEMENT OF CACHE USE REQUESTS SENT TO REMOTE CACHE DEVICES

TECHNICAL FIELD

Various examples are described herein that relate to cache content management techniques.

BACKGROUND

Computing systems commonly allow content of memory to be accessed by multiple processor elements at the same time. For example, a processor can store a copy of content in a cache and another processor can store the same copy of the content in another cache. Cache devices can provide more rapid access to data by a processor than that provided using a memory device. Cache coherence aims to provide the most current version of the content in memory and cache, so that a most current version is accessed and processed. In a case where a device or process sends a query to other remote devices or remote processes as to their access or use of cached content, a time to receive a response to the query can introduce a delay that slows system performance.

DETAILED DESCRIPTION

Figure 1:
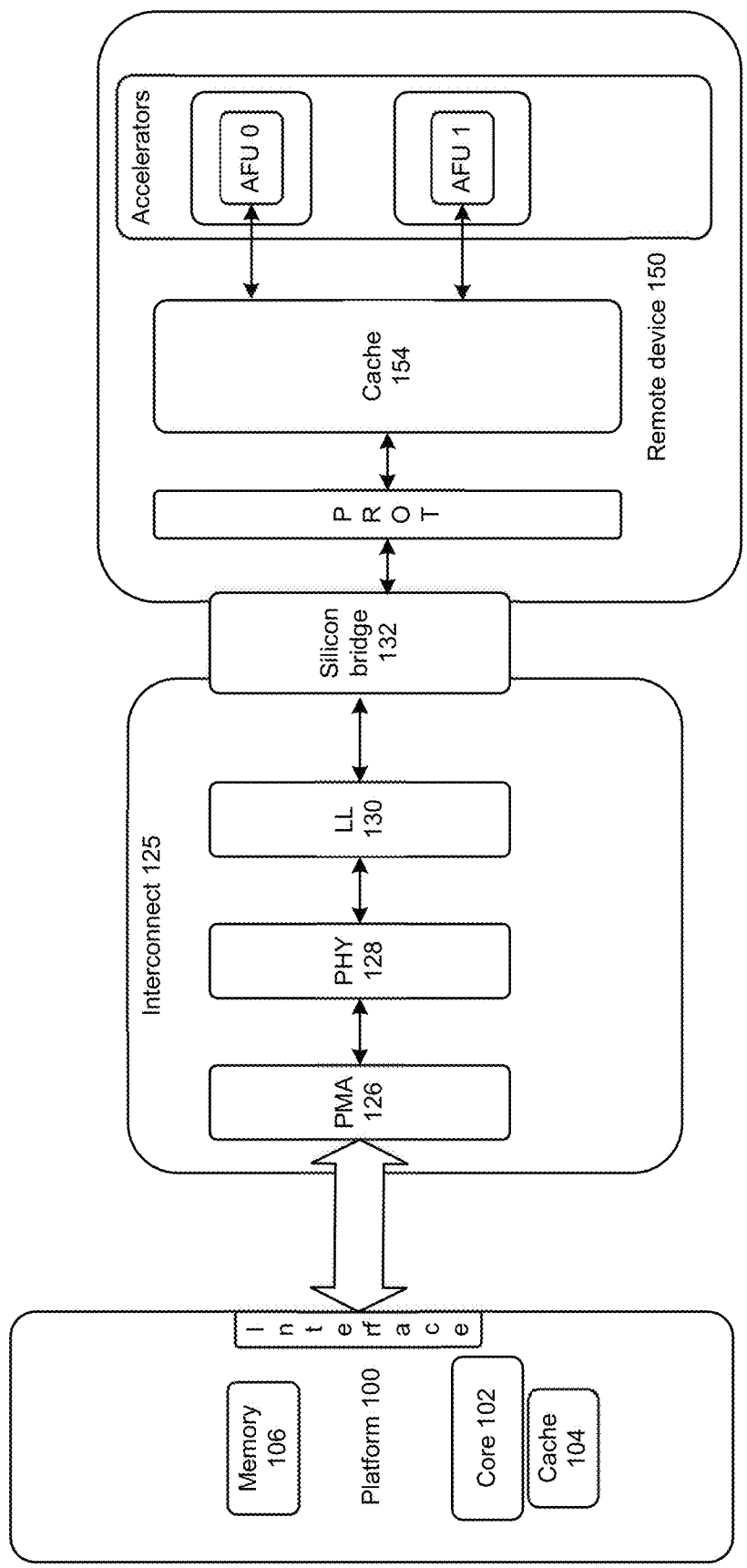
FIG. 1 depicts an example of a system in accordance with some embodiments.

A central processing unit (CPU) accessing content from a cache device can issue a snoop request to one or more remote cache devices to determine if any other cache device stores or uses the content. It is known that some CPUs use a remote snoop filter to prevent snoop requests from being sent to remote cache devices that are known to not store cache line content. However, the size of the snoop filter is limited and accordingly, the number of cache lines in remote cache devices that can be tracked is limited too. This in turn, puts an upper limit on the size of the remote cache that can be tracked by the snoop filter. In addition, the snoop filter can see thrashing in some cases that will result into back invalidations, and back invalidations are serially processed, which can introduce latency.

According to some embodiments, a CPU uses a cache and a cache coherency manager. Multiple remote devices (e.g., accelerators) use caches that can store content also stored by the CPU's cache. When a cache agent performs coherency management, a snoop can be performed for a cache line to retrieve the latest version of the cache line. Snoop responses from the accelerators can be received at different times from remote devices that operate at different rates that then CPU. The last received snoop response can limit performance of the CPU as the CPU waits for all responses to a snoop request. An early response to a snoop can be generated if a remote cache does not store content in the cache line such that the snoop does not have to be received by the remote cache or its agent to determine if the content is cached.

Various embodiments provide for managing cache snoop requests sent to one or more remote cache devices. The snoop request can request an indication of whether one or more remote cache devices store content identified by a memory address. An interconnect or link to the remote cache can include a cache snoop manager. The cache snoop manager can receive snoop requests and determine whether the one or more remote caches store content associated with the snoop requests. The cache snoop manager can track content of the one or more remote cache devices at level of a page of address memory locations where a page can store multiple cache lines of content. If a snoop request is associated with a page that has any content stored in one or more remote cache devices, the cache snoop manager can transfer the snoop request to the one or more remote cache devices. However, if the snoop manager does not identify any page associated with a snoop request as being stored in the one or more remote cache devices, then the snoop manager can respond to the requester that the one or more remote cache devices do not store the content. Accordingly, a latency from a response to a snoop request can be reduced at least because the request does not traverse a remaining signal path to the one or more remote cache devices and back to the requester. Also, in a case where a clock frequency of the one or more remote cache devices is lower than a clock frequency of the requester, the delay arising from a slower clock speed can be potentially reduced.

The cache snoop manager can use a coarser granularity or finer granularity than page level for tracking content of one or more remote caches. A coarse granularity segment or region size can be at larger than a page size (e.g., multiples of a smallest page size). A finer granularity can be smaller than a page size and closer to a cache line size (or a cache line size).

A remote cache device can communicate with a cache tracker. The cache tracker can generate allocations and de-allocations of cache line(s) and associated page addresses (or other segment or region sizes). The cache snoop manager can use a counter to count a number of cache lines allocated for a particular page. For a detected allocation of a page address that is not tracked by the cache snoop manager, an entry can be created in a table for the page address and a counter for the page address can be incremented by a number of cache line entries to be allocated in the remote cache device and the counter stored as associated with the page address. A peak number of counts for a page address can be a peak number of cache lines stored in a page.

For detected de-allocation of a page address that is tracked by the cache snoop manager, a counter associated with the page address can be decremented. If the counter associated with the page address decrements to zero, then no cache line entries are allocated to the page address, and the page address can be removed from the table.

Accordingly, if a count associated with a page entry is one or more, then the remote cache can store a cache line associated with the page address and snoop manager can forward the request to the remote cache device. But if a page entry is absent from a table managed by the snoop manager, then no cache line is cached in the remote cache device and the snoop manager responds to the requester indicating the remote cache device does not cache content indicated in the snoop request.

FIG. 1 depicts an example of a system. A computing platform can include a processor, memory, storage, interconnects, wired and wireless network interfaces, and other components. The computing platform can execute software that causes the platform to execute different tasks. In one example use, a CPU 102 uses a cache 104 to store content in one or more cache lines (e.g., 64 bytes or other sizes). Cached content can be a copy of content stored in memory or storage. The cached content can be accessed by CPU 102 as an operand and operations can be performed on the operand (e.g., add, subtract, transform, and so forth). In this example, CPU 102 can send a request to remote device 150 to determine whether remote device 150 stores any version of the cached content, to indicate to remote device 150 that CPU 102 is to own a copy of the cached content, or other requests. The request can be of a format that indicates a memory address associated with the cached content.

CPU 102 can transmit the snoop request to remote device 150 using interconnect 125. Interconnect 125 can be a single line or multiple line interconnect, bus or provide point to multi-point duplex transfer of signals (e.g., commands, data, and others). For example, interconnect 125 can include a variety of components such as a physical media access (PMA) block 126, physical layer interface (PHY) block 128 that provides Physical Coding Sublayer (PCS) processing, a link layer (LL) 130, silicon bridge 132, and other components. Silicon bridge 132 can provide for transmission and receipt of signals (e.g., commands, data, and others) between interconnect 125 and remote device 150.

In a case of CPU 102 or its agent issues a snoop request relating to cache 104, a round trip of a request/response would traverse the following path: CPU 102 transmit interface, interconnect 125 transmit, silicon bridge 132 receive, cache 154, silicon bridge 132 transmit, interconnect 125 transmit, and CPU 102 transmit receive. In a case where a clock speed of remote device 150 (e.g., 300 MHz) runs slower than CPU 102 clock speed (e.g., 1.4 GHz), snoop requests targeted to cache 154 can have a higher latency than snoop requests targeted to cache 104 associated with CPU 102. A snoop response generated by remote device 150 using a slower clock speed can limit the performance of platform 100, which runs at a higher clock speed. Platform 100 can delay performance of operations concerning the cache lines associated with the snoop request until a response to the snoop request is received. For example, in the above latency path, silicon bridge 132 running at 300-350 MHz can add up to 35-40 ns of round trip latency and remote device 150 running at 300-350 MHz can add another 40 ns roundtrip.

Figure 2:
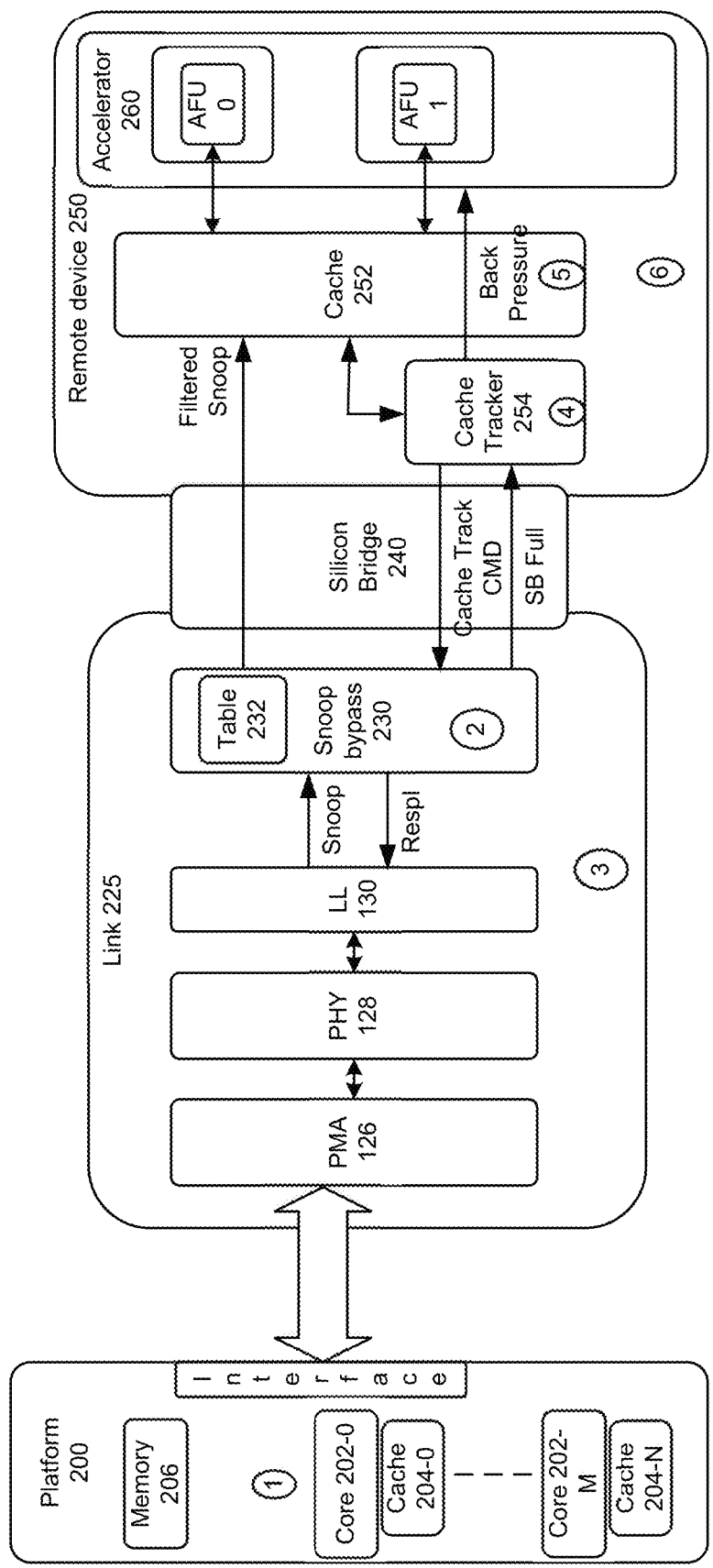
FIG. 2 depicts an example system in accordance with some embodiments.

FIG. 2 depicts an example system in accordance with some embodiments. Various embodiments provide a snoop bypass block which can track cache lines stored by a remote cache on page level granularity and provide early responses to incoming snoop commands if a portion of a page is not cached by the remote cache. Platform 200 can include core 202-0 to 202-M, cache 204-0 to 204-N, and memory 106, where M and N are integers of 1 or more. Cores 202-0 to 202-M can be an execution core or computational engine that is capable of executing instructions. Cores 202-0 to 202-M can be homogeneous and/or heterogeneous devices. One or more of cores 202-0 to 202-M can have access to their own cache 204-0 to 204-N and read only memory (ROM), or they can share cache or ROM. Any type of inter-processor communication techniques can be used, such as but not limited to messaging, inter-processor interrupts (IPI), inter-processor communications, and so forth. Cores 202-0 to 202-M can be connected in any type of manner, such as but not limited to, bus, ring, or mesh.

Cores 202-0 to 202-M can also include a system agent (not depicted). System agent can include or more of: a memory controller, a shared cache, a cache coherency manager, arithmetic logic units, floating point units, core or processor interconnects, or bus or link controllers. System agent can provide one or more of: DMA engine connection, non-cached coherent master connection, data cache coherency between cores and arbitrates cache requests, or Advanced Microcontroller Bus Architecture (AMBA) capabilities.

One or more of core 202-0 to 202-M can have a dedicated cache or share one or more caches. If a core 202 requests one or more cache lines to consume from a cache 204, a device can issue a snoop command to one or more remote cache devices (e.g., remote cache 252) to request to receive a most up-to-date version of content stored in the one or more cache lines or other responses (e.g., cache shared, cache ownership, and so forth). Other types of snoop commands can be used (e.g., cache line invalidate). A snoop command can conform with an applicable specification (e.g., Intel Ultra Path Interconnect (UPI) or other cache coherency scheme). The core 202 can wait for a response to the snoop command (e.g., no match, match with data, data shared, data exclusive owned, and so forth). For example, a core 202 can use a caching and home agent (CHA) or other accelerator device or process to provide data coherency among multiple cache devices.

For example, a core 202 or its agent can cause a snoop to be broadcast to all cache agents or cache devices and wait for all responses to be received prior to consuming data in a cache or requesting data from a memory (e.g., memory 206). A cache agent that is slow to respond because of a slow clock speed can increase the time to complete a snoop and delay the core from accessing data. In some embodiments, a core 202 can look at a table or directory that indicates which remote caches share a cache line (e.g., cache content from the same memory locations) and send snoop commands solely to remote cache devices that store the content of the cache line(s) of interest.

Core 202 can transmit a snoop command (shown as "Snoop") to cache 252 of remote device 250 using link 225. Link 225 can provide a connection between platform 200 and remote device 250 using an applicable specification or standard (e.g., PCI, PCIe, Ultra Path Interconnect (UPI), and so forth). In some embodiments, link 225 can provide a connection between one or more cores and one or more remote devices. Link 225 can use physical media access (PMA) block 126, physical layer interface (PHY) block 128 that provides Physical Coding Sublayer (PCS) processing, a link layer (LL) 130, and snoop bypass block 230, and other components. Snoop bypass block 230 can be implemented as a snoop command intercept block. Silicon bridge 240 can provide for transmission and receipt of signals (e.g., commands, data, and others) between link 225 and remote device 250.

Snoop bypass block 230 can receive snoop commands from a core and preemptively respond to snoop commands. Snoop bypass block 230 can receive and process incoming snoop commands sent to remote device 250. Snoop bypass block 230 reviews incoming snoop commands and compares the snoop address provided with the snoop command with page addresses in table 232. A snoop address can be a full cache line address and can include a page address (e.g., more significant bits of the cache line address). If there is no match between a page address (derived from the snoop address) and a page address tracked in table 232, cache 252 does not have cached content and snoop bypass block 230 informs a core 202 that issued the snoop command that the cached content is not present in cache 252 (response shown as response invalid ("RespI")).

If cache 252 includes at least one entry from a page having the page address associated with the snoop command or stores the cache line associated with the snoop address, snoop bypass block 230 transfers the snoop command to cache 252 (shown as "Filtered Snoop"). For example, snoop bypass block 230 can track page addresses (or higher or lower levels of granularity) associated with cached content in cache 252. Snoop bypass block 230 can use and access table 232 to determine cached content in cache 252. Access table 232 can be stored using a content-addressable memory (CAM). For example, a format of entries in table 232 is shown below.

TABLE 1

| Bits | Field Name | Example Description |
| --- | --- | --- |
| [0] | Valid | Indicates page entry is valid |
| [39:0] | Page Address | Page address being tracked (e.g., bits [51:12] of cache line address) |
| [1:0] | Parity | Address parity |
| [11:0] | Page counter | Keeps track of number of lines allocated from associated page |

The Valid field can indicate whether a page entry is valid or invalid. The Page Address field can indicate a page address of a physical page having content stored in cache 252. The Parity field can be used for parity checking of an address. The Page counter field can indicate a number of lines allocated to a particular page address. For example, cache tracker 254 can indicate when a cache line has been allocated or deallocated in cache 252. Allocation of a cache line associated with the page address can cause the page counter field to increment whereas deallocation of a cache line associated with the page address can cause the page counter field to decrement. In this example, page counter field can be 12 bits and count a number of 64 byte cache lines up to a page size of 256 kilobytes, although other sizes can be applied.

A granularity of content stored in the remote cache device can be modified to be larger or smaller than page address level. For example, table 232 can be used to identify cache lines that are stored in the remote cache device by address. However, the table size would expand. Conversely, a granularity that is too large can allow too many snoops to pass through to remote cache devices even if the content is not stored and reduce performance advantages of snoop bypass block.

In some embodiments, instead of use of a page counter or in addition to use of a page counter, table 232 can track which cache line is stored by cache 252. For example, cache tracker 254 can issue a bit vector indicating cache line allocate or cache line deallocate and a specific cache line address that indicates which cache line is allocated or deallocated in cache 252. Table 232 can store all cache line addresses that are cached by cache 252.

Table 232 can be expanded to track cache line content of shared or exclusive and can be used to inform a core. For example, snoop bypass block 230 can issue RespS (response shared) to indicate a cache line is shared or RespE (response exclusive) to indicate a cache line is exclusively owned. Snoop bypass block 230 can provide responses for other requests.

Silicon bridge 240 can provide an input/output connection from link 225 to remote device 250 (or multiple instances of remote device 250).

Remote device 250 can include one or more accelerator devices that use one or more caches. Cache 252 can include a volatile cache device capable of storing multiple cache lines (e.g., cache lines of 64 bytes in size or other sizes). Cache lines can have associated physical addresses in memory. Cache tracker block 254 sends a command to snoop bypass block 230 to inform snoop bypass block 230 if a new cache line is allocated in cache 252 (e.g., written from memory into cache) or deallocated from cache 252 (e.g., removed, overwritable, or overwritten in cache 252). In response to a cache line allocation, snoop bypass block 230 can form a new page table entry and increase a counter for the page table entry. For example, if an allocate line command does not have a hit in table 232, snoop bypass block 230 can allocate a page table entry and increment its counter to indicate a number of allocated cache lines. If an allocate line command has an associated page table entry in table 232, snoop bypass block 230 can increase the counter by a number of allocated cache lines.

A deallocate line command can cause snoop bypass block 230 to decrease or decrement the counter for an associated page table entry in table 232. A deallocate command can be used in connection with eviction of a cache line from cache 252. If the counter value reaches "0", snoop bypass block 230 can evict the page table entry to signify cache 252 does not cache any line from the page address.

The following provides an example of a command format used by cache tracker 254 to inform snoop bypass 230 of an allocation or deallocation of a cache line in cache 252.

TABLE 2

| Bits | Field Name | Example Description |
| --- | --- | --- |
| [0] | Valid | Indicates command from cache agent is valid |
| [3:1] | Commands | 000 = allocate from cache tracker<br>001 = software allocate<br>100 = deallocate from cache tracker<br>101 = software deallocate<br>111 = software lookup |
| [43:4] | Page address | Page address of cache line associated with allocate/deallocate command |
| [45:44] | Reserved | Cache Tracker 254 |

Page address field having bits 43:4 can include cache address bit[51:12]. Bits 51:12 can be used to identify a 4096 byte page (page level granularity). A finer granularity than page level can be used by expanding the number of bits in the address field. For example, if the Page address field is expanded to bits 51:6, the Page address field can provide cache line granularity for a cache line size of 64 bytes.

In some examples, a command field (e.g., bit vector) can be 1 bit and indicate allocate or deallocate. In addition, the Page address field can be expanded to include cache line address level information to identify a cache line address that is allocated or de-allocated.

Accelerators 260 can provide services implemented by hardware or specific functions or processes executed by processors (e.g., machine learning, deep learning, image recognition, voice recognition, and so forth). Accelerators 260 can write content to cache 252 or read content from cache 252. For example, an accelerator can include or provide a neural network, processors, and memory. Processors can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). A neural network can be embodied as a separate neural network device use any components of processors. Multiple neural networks, processor cores, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

The following provides an example of operating frequencies of elements of the system of FIG. 2.

| Index | Frequency | Block |
|---|---|---|
| 1 | 1.4 GHz | Core 202-0 to 202-M |
| 2 | 700 MHz | Snoop Bypass block 230 |
| 3 | 700 MHz | Link 225 |
| 4 | 350 MHz | Cache Tracker 254 |
| 5 | 350 MHz | Cache 252 |
| 6 | 350 MHz | Remote device 250 |

Figure 3:
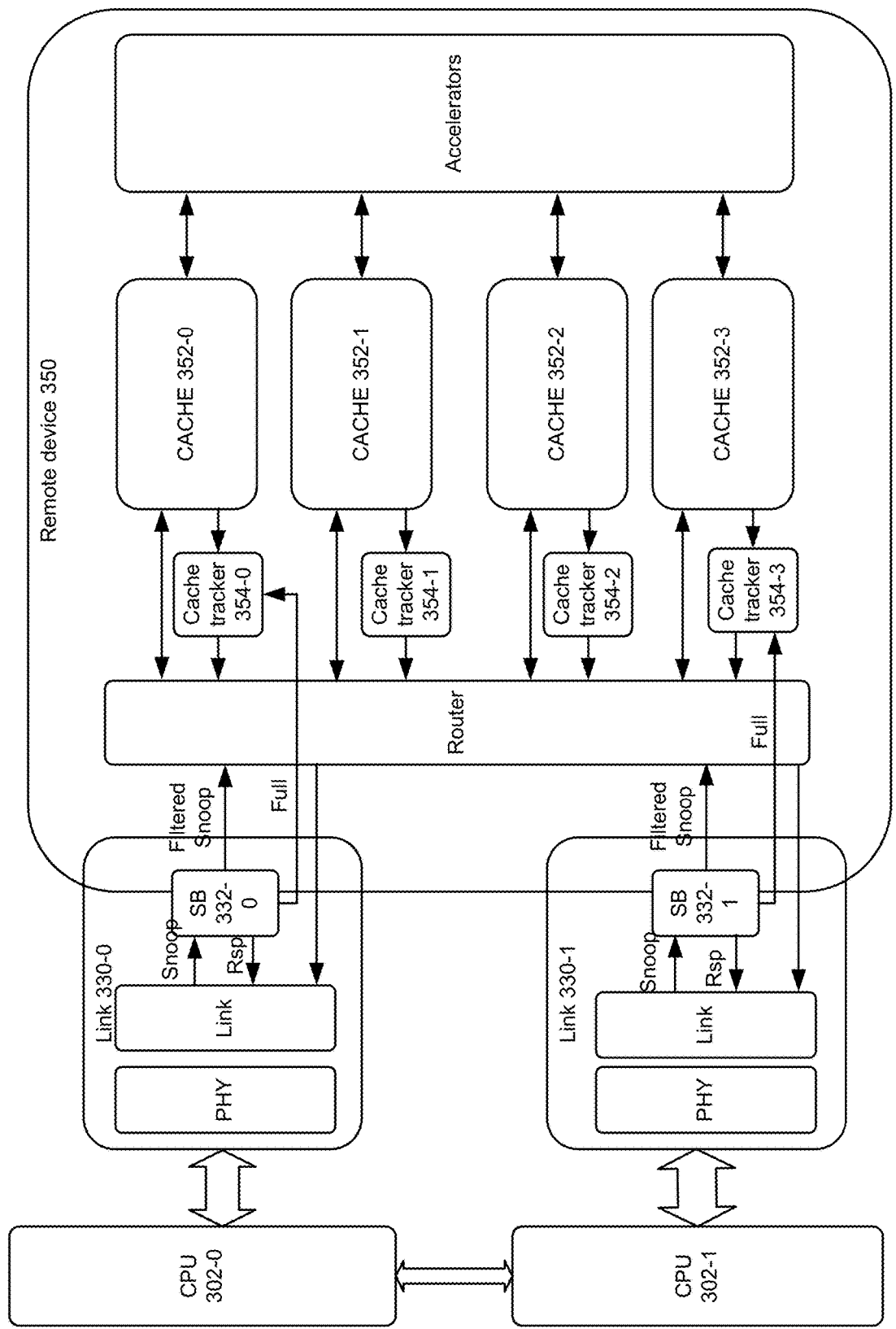
FIG. 3 depicts an example system in accordance with some embodiments.

FIG. 3 depicts an example system that can provide snoop bypass blocks for cache devices for multiple accelerator or other devices. In this example, CPU 302-0 and 302-1 can issue snoop requests to multiple remote cache devices 352-0 to 352-3. Snoop bypass block 332-0 and 332-1 can receive snoop requests and determine which, if any, of remote cache devices 352-0 to 352-3 store content associated with the snoop request. For example, snoop bypass block 332-0 and 332-1 can identify whether any part of a segment of memory is stored in cache devices 352-0 to 352-3. A segment can be a page worth of memory. For example, if a cache line worth of a page region is stored in a particular one or more cache devices, either or both of snoop bypass block 332-0 or 1 can forward the snoop command to the particular one or more cache devices among cache devices 352-0 to 352-3. For a snoop command corresponding to a segment where none of the segment is stored in any of cache devices 352-0 to 352-3, snoop bypass block does not forward the snoop request to any cache device and responds to the CPU with an indication that no cache stores the relevant content.

Cache tracker 354-0 to 354-3 can monitor for cache line allocations or deallocations and the particular associated segment in respective caches 352-0 to 352-3. Any or all of cache trackers 354-0 to 354-3 can inform snoop bypass block 332-0 and 332-1 of allocations and deallocations in respective caches 352-0 to 352-3.

Other topologies can be used. A snoop bypass block can be used for multiple cache devices. Several snoop bypass blocks can be used to determine whether any part of a segment of memory is stored in multiple cache devices.

Figure 4:
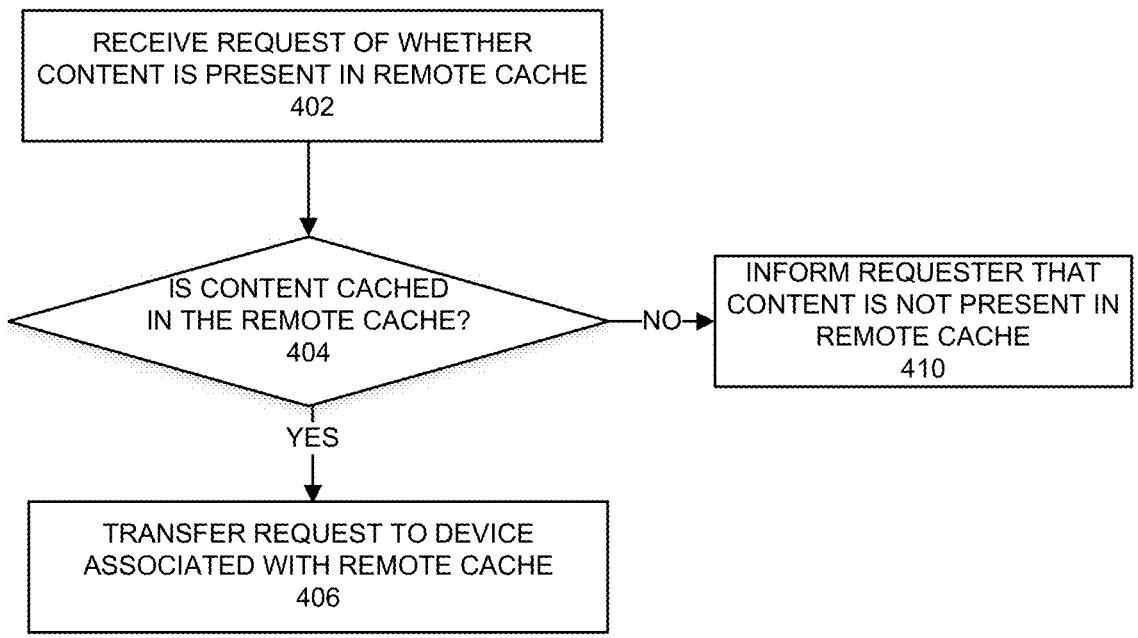
FIG. 4 depicts a process in accordance with some embodiments.

FIG. 4 depicts a process that can be used to determine whether to transfer a snoop command to a remote cache or to respond to the snoop command. The process of FIG. 4 can be performed by a snoop bypass block or other process or hardware device that receives snoop commands from a core or cores prior to receipt by one or more remote caches or their agent(s). At 402, a request is received as to whether content is present in a remote cache. For example, the request can be a snoop command sent by a processor core or an agent or process affiliated with managing content stored or used in a cache. The request can identify a cache line by memory address and/or the cache line's associated page address. At 404, a determination can be made as to whether content is stored in the remote cache. For example, the determination can be made based on a table that stores an indication of whether any content from a page corresponding to a page address is stored in the remote cache. The table can be updated based on remote cache content allocation or deallocation commands from an agent associated with the remote cache, where the agent monitors the remote cache for any cache line allocation or deallocation. If the table indicates that one or more portions of the page are stored in the remote cache, then the determination can be that content is stored in the remote cache and 406 can follow. A portion can be a cache line worth of data from a page. Page size is an example, and larger or smaller sizes can be used.

At 406, the request is transferred to the device associated with the remote cache. For example, the request can be forwarded by a snoop bypass block to a remote device that uses or includes the remote cache.

Referring back to 404, if the table indicates that no portion of the page is stored in the remote cache, then the determination can be that content is not stored in the remote cache and 410 can follow 404. For example, if the table has no entry for the page (or other size of data) associated with the snoop request, there can be a determination that content is not stored in the remote cache. At 410, a response can be sent to a request sender that the content is not present in the remote cache. The snoop bypass block can form and transmit a response to the requester (e.g., core or cache agent or process) indicating the remote cache does not include the content. Accordingly, a response time from a remote cache to a snoop request can be reduced by use of the process of FIG. 4.

Figure 5:
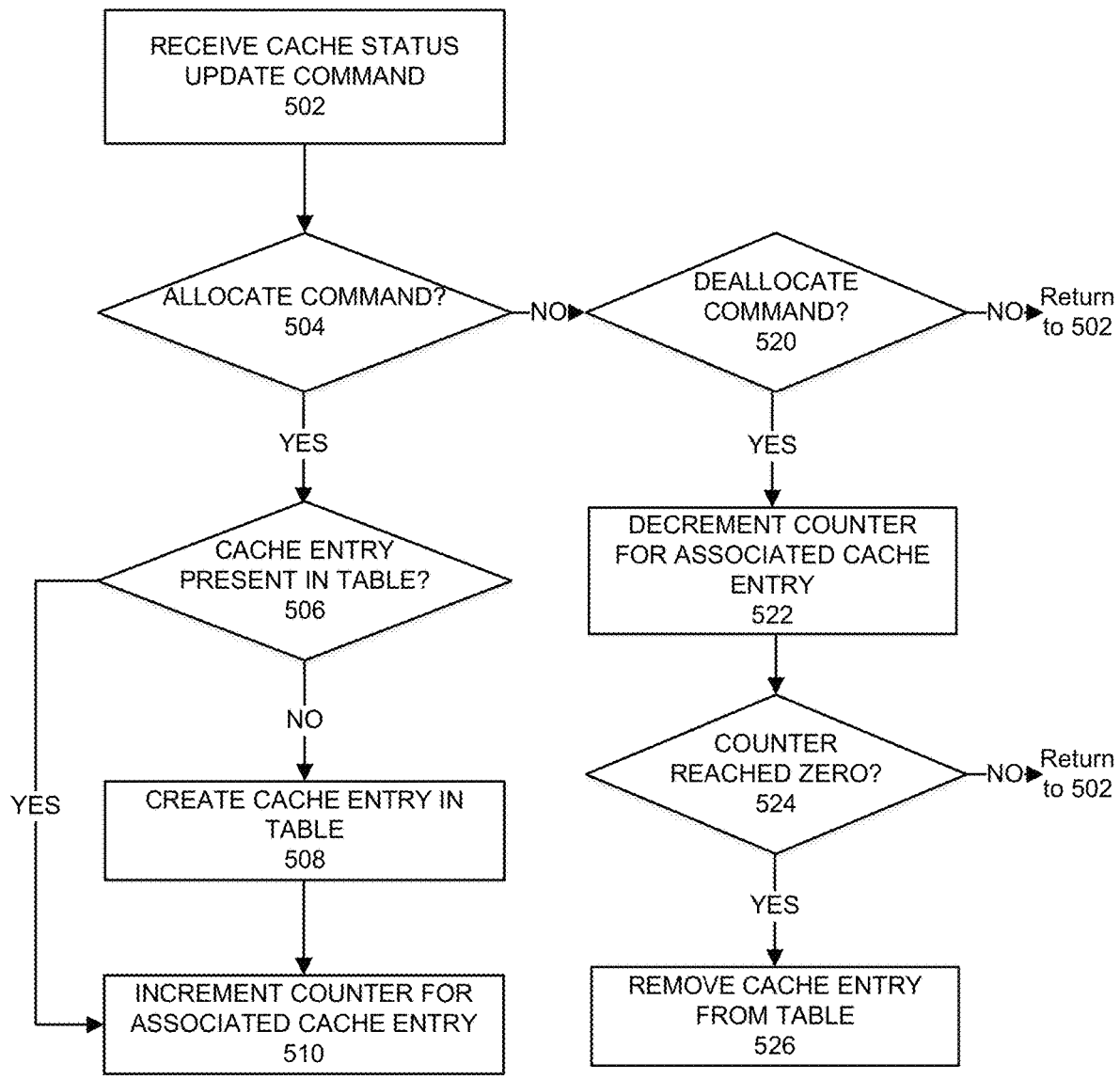
FIG. 5 depicts an example process in accordance with some embodiments.

FIG. 5 depicts an example process. The process of FIG. 5 can be used or performed by a snoop bypass block to update a table that indicates whether any content from a page (or other size) is stored in a remote cache. At 502, a cache status update command is received. For example, a cache tracker associated with a remote cache can monitor cache line allocations, cache line deallocations, cache line shares, cache line exclusive ownership, and other cache line activities. The cache tracker can provide the cache status update command to the snoop bypass block. At 504, a determination is made as to whether the command is a cache allocate command. A cache allocate command can indicate that a cache line was allocated in the remote cache. The cache allocate command can be signified by a code. A snoop bypass block can determine if the command is a cache allocate command. If the command is a cache allocate command, then 506 can follow. If the command is not a cache allocate command, then 520 can follow.

At 506, a determination is made as to whether a cache entry is present in a table. The table can be used by the snoop bypass block to identify whether a page has content in a remote cache and a number of cache lines worth of content from the page. For example, a page can be 4096 kilobytes and a cache line can be 64 bytes, although other sizes can be used. If the table includes an entry for a page associated with the cache entry identified in the cache status update command, then the cache entry can be determined to be present in the table. If the table does not include an entry for a page associated with the cache entry identified in the cache status update command, then the cache entry can be determined to be not present in the table. If the cache entry is determined to not be present in the table, 508 follows 506. If the cache entry is determined to be present in the table, 510 follows 506.

At 508, a cache entry can be created in the table. For example, an entry for a page address associated with the status update command can be created in the table. At 510, a counter is incremented or increased for the table entry based on the number of allocated cache lines.

Referring to 504, if the status update command is not an allocate command, then 520 can determine if the command is a deallocate command. The status update command can indicate if the command is a deallocate command based on a code. If the command is a deallocate command, then at 522, a counter is decremented or decreased for the associated cache entry based on the number of de-allocated cache lines. The entry can include a page address and an associated counter of number of cache lines that have been copied (e.g., allocated) from the page into the cache. If the command is not a deallocate command, then the process returns to 502 or performs another action.

At 524, a determination is made as to whether the counter has reached zero. If the counter has not reached zero, then the process returns to 502 or performs another action. If the counter has reached zero, then at 526, the cache entry is removed from the table. A cache entry corresponding to a page with a count of zero indicates that the remote cache does not store any content from that page. If a snoop command is received, then a lack of a cache entry for a page address associated with the snoop command can cause the snoop bypass block to respond to the snoop command sender or initiator that the remote cache does not include the cached content.

Figure 6:
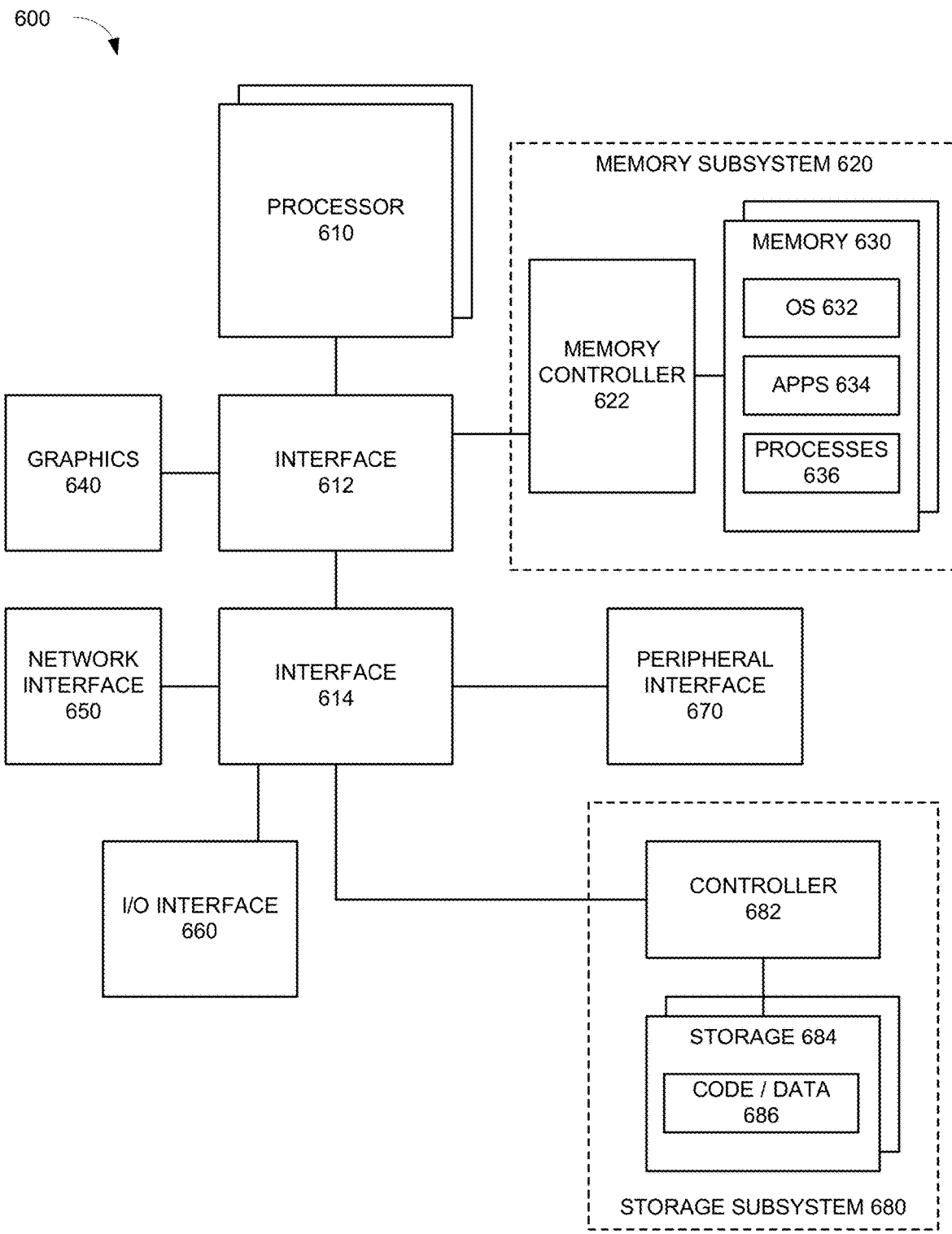
FIG. 6 depicts an example system in accordance with some embodiments.

FIG. 6 depicts an example system. Various embodiments described herein can be used in system 600. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard bus.

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a remote device, which can include sending data stored in memory. Network interface 650 can receive data from a remote device, which can include storing received data into memory.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Figure 7:
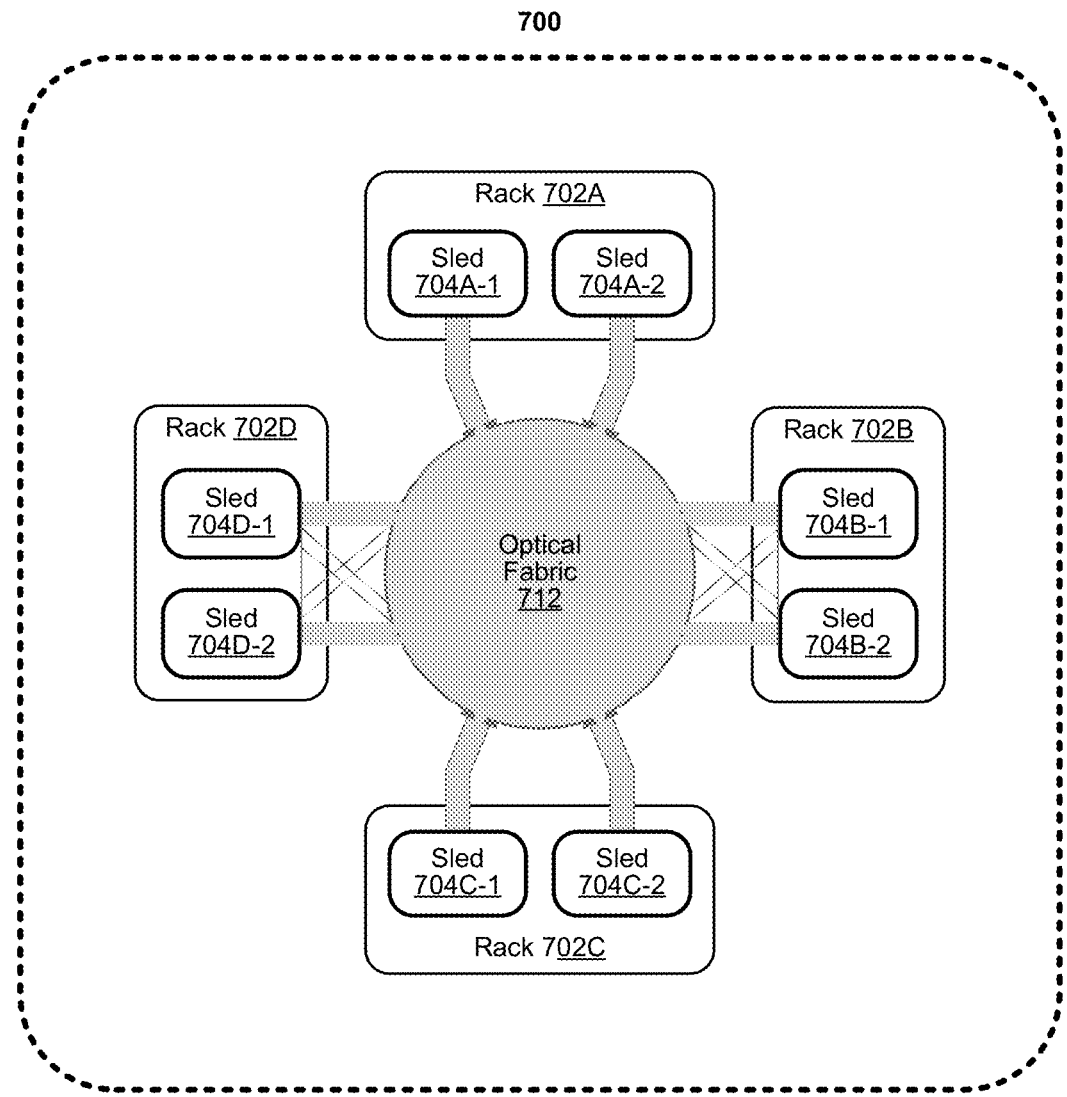
FIG. 7 depicts an example of a data center in accordance with some embodiments.

FIG. 7 depicts an example of a data center. Various embodiments described herein can be used in the data center 700. As shown in FIG. 7, data center 700 may include an optical fabric 712. Optical fabric 712 may generally include a combination of optical signaling media (such as optical cabling) and optical switching infrastructure via which any particular sled in data center 700 can send signals to (and receive signals from) each of the other sleds in data center 700. The signaling connectivity that optical fabric 712 provides to any given sled may include connectivity both to other sleds in a same rack and sleds in other racks. Data center 700 includes four racks 702A to 702D and racks 702A to 702D house respective pairs of sleds 704A-1 and 704A-2, 704B-1 and 704B-2, 704C-1 and 704C-2, and 704D-1 and 704D-2. Thus, in this example, data center 700 includes a total of eight sleds. Optical fabric 712 can provide each sled signaling connectivity with one or more of the seven other sleds. For example, via optical fabric 712, sled 704A-1 in rack 702A may possess signaling connectivity with sled 704A-2 in rack 702A, as well as the six other sleds 704B-1, 704B-2, 704C-1, 704C-2, 704D-1, and 704D-2 that are distributed among the other racks 702B, 702C, and 702D of data center 700. The embodiments are not limited to this example.

Figure 8:
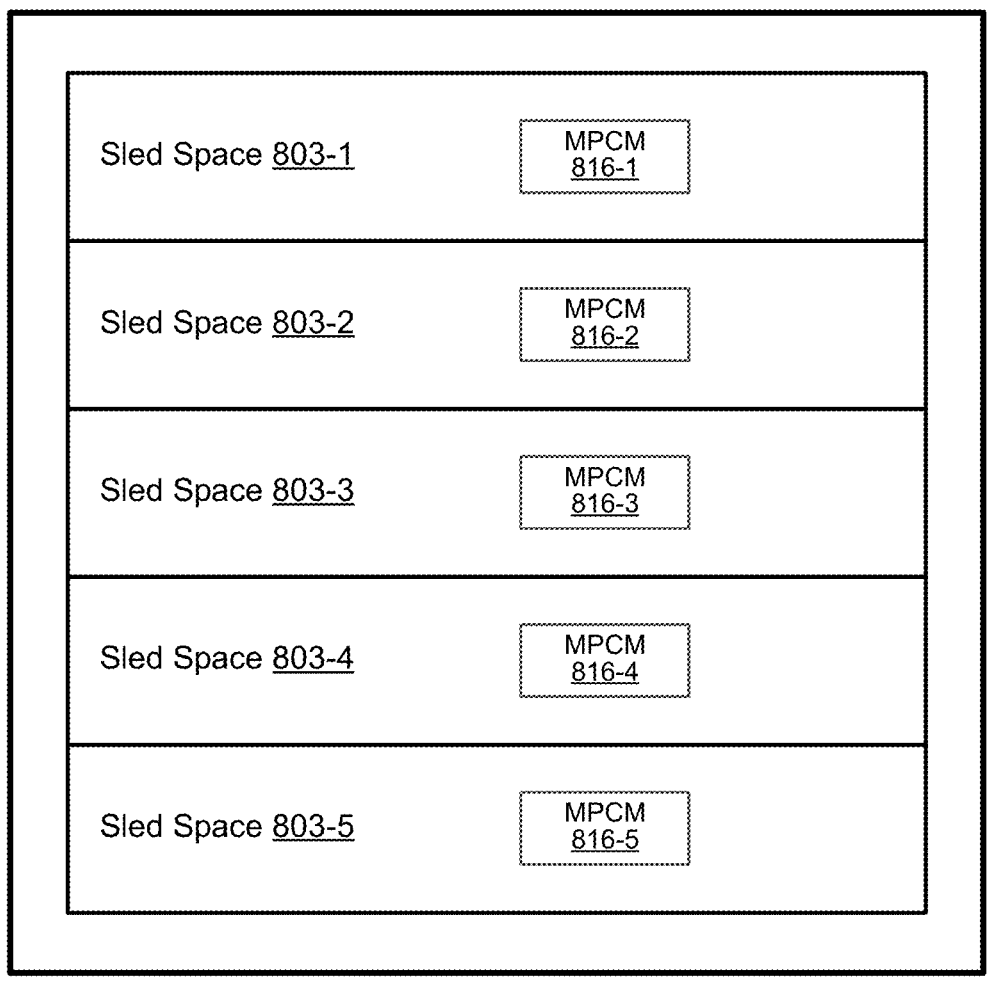
FIG. 8 depicts a rack architecture in accordance with some embodiments.

FIG. 8 depicts a rack architecture such that a plurality of sled spaces can have sleds inserted. Various embodiments described herein can be used in the architecture of FIG. 8. Sled spaces can be robotically-accessible via a rack access region 801. In the particular non-limiting example, rack architecture 800 features five sled spaces 803-1 to 803-5. Sled spaces 803-1 to 803-5 feature respective multi-purpose connector modules (MPCMs) 816-1 to 816-5.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

What is claimed is:

1. An apparatus comprising:
an interface and
circuitry communicatively coupled to the interface, the circuitry to maintain a table of segments that identifies one or more entries stored in a remote cache, wherein the circuitry is to:
receive a snoop command that references a first segment;
based on the table, determine whether a segment is stored in a remote cache or not stored in the remote cache;
based on the table indicating that at least one entry of the first segment is stored in the remote cache, forward the snoop command to the remote cache; and
based on the table indicating that no entry of the first segment is stored in the remote cache, provide a response with an indication that the remote cache does not store content associated with the snoop command and not forward the snoop command to the remote cache.

2. The apparatus of claim 1, wherein the table comprises an address identifier of a segment and a count of a number of entries from the segment that are stored in the remote cache.

3. The apparatus of claim 1, wherein:
the first segment comprises a page,
the table comprises a count of a number of cache line entries from the page that are stored in the remote cache, and
the table comprises an address identifier of a page address of the page.

4. The apparatus of claim 1, wherein the snoop command comprises a request to indicate whether the remote cache stores a copy of content associated with a memory address.

5. The apparatus of claim 1, wherein:
the circuitry is to update the table based on a command from circuitry associated with the remote cache,
in response to receipt of an allocate command for a segment, the circuitry is to increase a count of a number of entries associated with the segment, and
in response to receipt of a de-allocate command for a segment, the circuitry is to decrease a count of a number of entries associated with the segment.

6. The apparatus of claim 5, wherein:
in response to receipt of an allocate command for a segment and the segment is not maintained in the table, the circuitry is to create an entry for the segment and increase a count of a number of entries associated with the segment.

7. The apparatus of claim 5, wherein:
in response to receipt of a de-allocate command for a segment and the count is a value of one, the circuitry is to remove an entry for the segment from the table.

8. The apparatus of claim 1, wherein the interface comprises an interface between a computing platform and at least a remote device.

9. The apparatus of claim 1, further comprising a processor core communicatively coupled to the interface.

10. The apparatus of claim 1, further comprising the remote cache communicatively coupled to the interface.

11. The apparatus of claim 1, further comprising a field programmable gate array (FPGA) and wherein the FPGA comprise the remote cache.

12. A system comprising:
a network interface;
a processor communicatively coupled to the network interface;

a link comprising circuitry to receive a snoop command, the link communicatively coupled to the processor; and an accelerator device communicatively coupled to the link, the accelerator device comprising a remote cache device, wherein:

the circuitry is to maintain a table that is to indicate at least one segment stored in the remote cache device;

the circuitry is to receive a snoop command from the processor and to determine whether to forward the snoop command or reply based on whether the table indicates that the remote cache device stores content from a same segment as that associated with the snoop command; and the circuitry is to forward the snoop command to the remote cache device based on the table indicating that content from the same segment as that associated with the snoop command is stored in the remote cache device.

13. The system of claim 12, wherein the segment comprises a page and the content comprises a cache line.

14. The system of claim 12, wherein the circuitry is to reply with an indication that the remote cache device does not store content associated with the snoop command based on the table indicating that no content from the same segment as that associated with the snoop command is stored in the remote cache device.

15. A method comprising:

receiving a snoop request identifying a memory address of content and requesting an indication of whether a copy of the content is stored in one or more remote cache devices;

determining whether to forward the snoop request to the one or more remote cache devices or to respond indicating the content is not stored in the one or more remote cache devices based on a table that indicates whether a region associated with the memory address is stored in the one or more remote cache devices; and forwarding the snoop request to at least one of the one or more remote cache devices based on the table indicating that the region associated with the memory address is stored in the at least one of the one or more remote cache devices.

16. The method of claim 15, comprising receiving the snoop request from a core.

17. The method of claim 15, comprising:

maintaining the table to include one or more regions with at least one portion stored in the one or more remote cache devices, wherein the table comprises a region address and an associated count of a number of portions stored in the one or more remote cache devices.

18. The method of claim 17, comprising:

updating the table based on commands from an agent of the one or more remote cache devices;

in response to receipt of an allocate command for a portion, increasing a count of a number of portions associated with the region; and in response to receipt of a de-allocate command for a portion, decreasing a count of a number of portions associated with the region.

19. The method of claim 17, comprising:

responding that the content is not stored in the one or more remote cache devices based on the table not including a region address associated with the snoop request.

20. The method of claim 15, wherein the memory address comprises a subset of the region.

\* \* \* \* \*